A. J. SCHOENBEIN.
AUTOMATIC GEAR SHIFTING MECHANISM.
APPLICATION FILED AUG. 24, 1916.
1,279,765.
Patented Sept. 24, 1918.
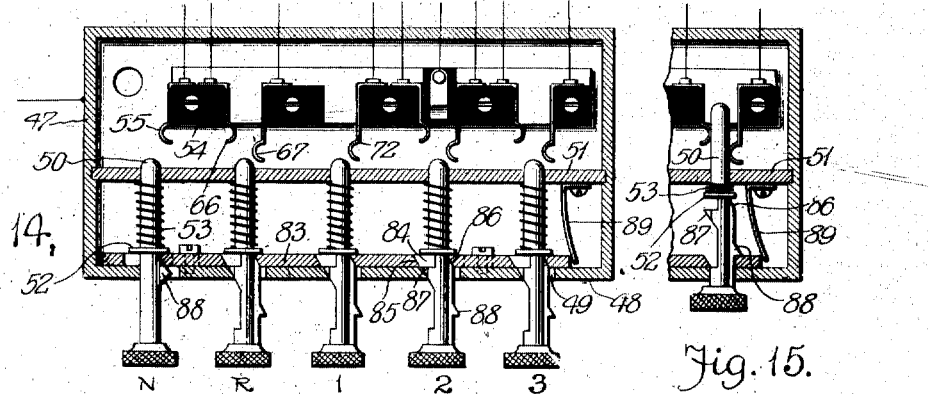
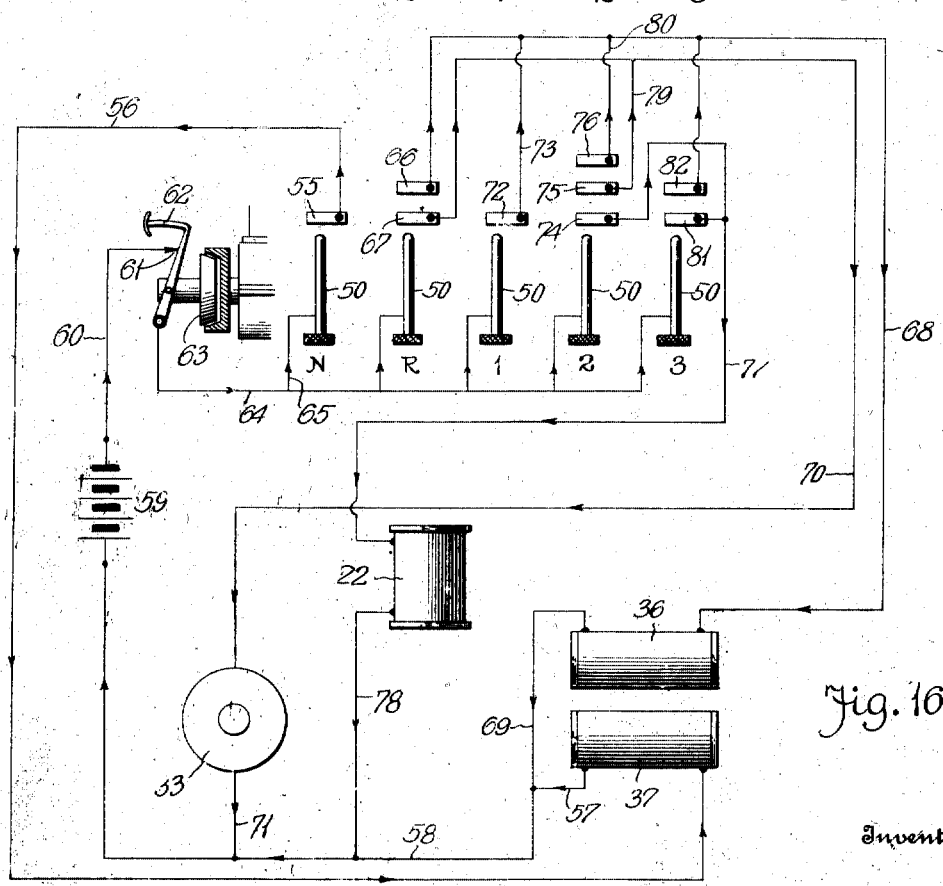
Witness
Chas. W. Stauffiger
Harlo F. Butler
Inventor
Albert J. Schoenbein.
By
Attorneys

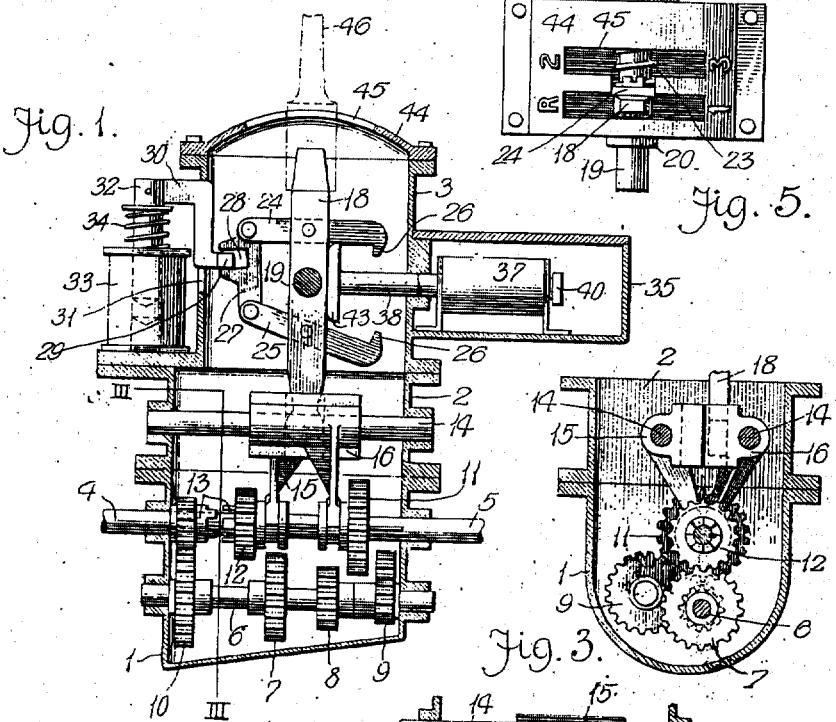
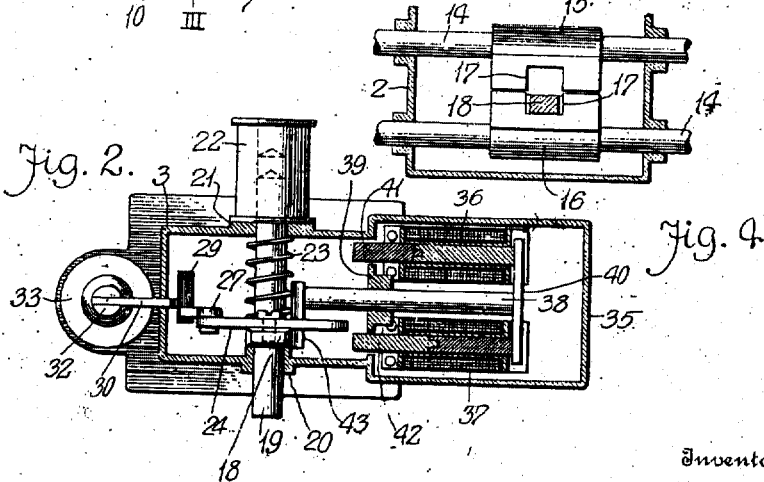

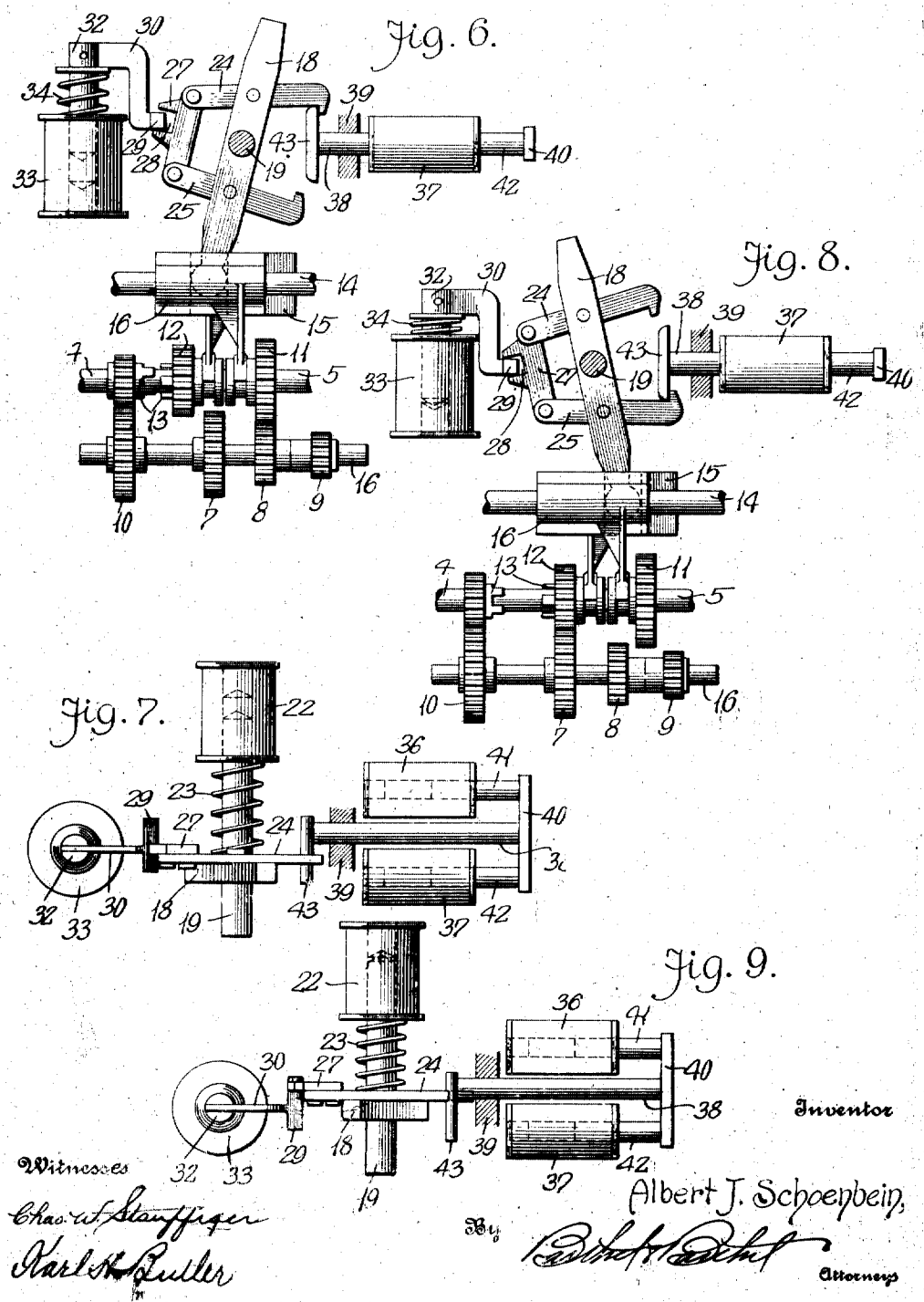

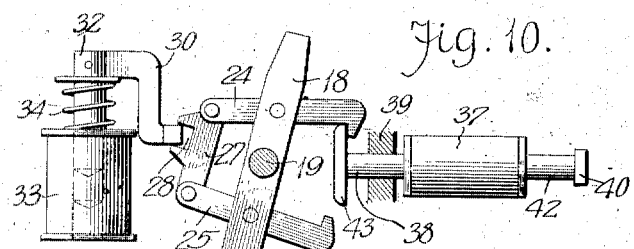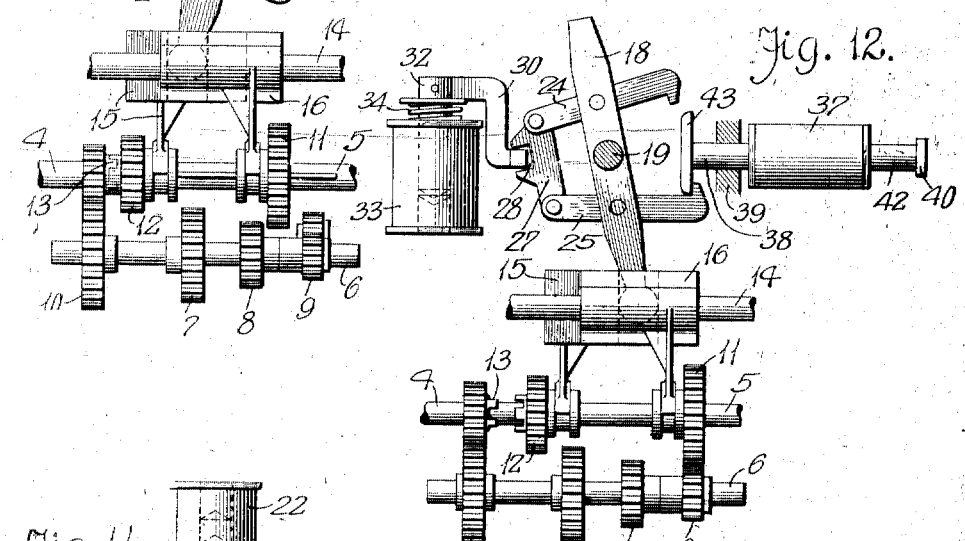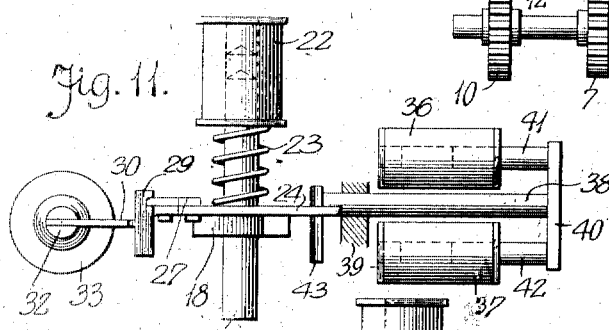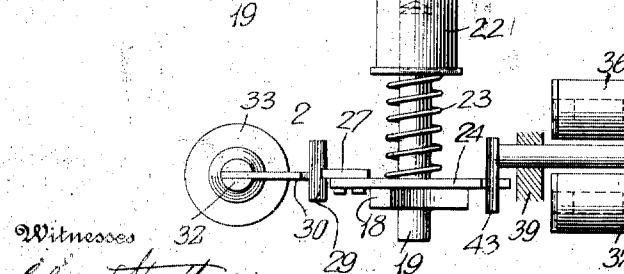

UNITED STATES PATENT OFFICE.

ALBERT J. SCHOENBEIN, OF FORT WAYNE, INDIANA.

AUTOMATIC GEAR-SHIFTING MECHANISM.

1,279,765.　　　　　Specification of Letters Patent.　　Patented Sept. 24, 1918.

Application filed August 24, 1916.　Serial No. 116,705.

*To all whom it may concern:*

Be it known that I, ALBERT J. SCHOENBEIN, a citizen of the United States of America, residing at Fort Wayne, in the county of Allen and State of Indiana, have invented certain new and useful Improvements in Automatic Gear-Shifting Mechanism, of which the following is a specification, reference being had therein to the accompanying drawings.

This invention relates to an automatic gear shifting mechanism, and the primary object of my invention is the provision of electrical means, in a manner as hereinafter set forth, whereby the shiftable gears of a change speed mechanism may be easily, quickly and accurately moved to neutral, reverse first, second and third speed positions.

Another object of my invention is to provide an electrical gear shifting mechanism for motor vehicles that cannot be operated when the clutch of the vehicle is thrown in, thereby precluding any danger of the gears of the change speed mechanism being stripped or mutilated.

A further object of my invention is to provide a novel selector device for the various operating instrumentalities of the gear shifting mechanism, which permits of a selected instrumentality being operated and automatically locks all of the other instrumentalities against accidental actuation, the idle instrumentalities, as well as the positively actuated instrumentalities remaining so until the change gear speed mechanism is brought to neutral position.

A still further object of my invention is to provide an automatic gear shifting mechanism that may be hand actuated in the usual manner should any short circuits occur or the automatic mechanism be injured.

A still further object of my invention is to provide an automatic gear shift mechanism wherein the parts are constructed with a view of reducing the cost of manufacture and at the same time retain the features by which safety, durability, simplicity of construction and ease of assembling are secured.

With such ends in view, my invention resides in the novel construction, combination and arrangement of parts to be hereinafter specifically described and then claimed.

Reference will now be had to the drawings, wherein

Figure 1 is a longitudinal sectional view of the automatic gear shifting mechanism showing the same in neutral position;

Fig. 2 is a plan of a portion of the same, showing the main actuating electrical devices in section;

Fig. 3 is a vertical sectional view taken on the line III—III of Fig. 1;

Fig. 4 is a plan of direct gear shifting members;

Fig. 5 is a plan of an H plate, showing a portion of the mechanism in neutral position;

Fig. 6 is a side elevation of a portion of the automatic gear shift mechanism in first speed position;

Fig. 7 is a plan of the same;

Fig. 8 is a side elevation of a portion of the automatic gear shift mechanism in second speed position;

Fig. 9 is a plan of the same;

Fig. 10 is a side elevation of a portion of the automatic gear shift mechanism, showing the mechanism in third speed position;

Fig. 11 is a plan of the same;

Fig. 12 is a side elevation of a portion of the automatic gear shift mechanism in reverse position;

Fig. 13 is a plan of the same;

Fig. 14 is a horizontal sectional view of the selector mechanism showing the locking device for the mechanism;

Fig. 15 is a similar view of a portion of the mechanism, showing one of the push buttons or circuit controlling instrumentality in a locked position; and Fig. 16 is a diagrammatic view illustrating the selector mechanism in circuit with the various electrical operating devices.

In describing my invention by aid of the views above referred to, I desire to point out that the same are intended as merely illustrative of an example whereby my invention may be put into practice, and I do not care to confine my invention to the precise construction and arrangement of parts shown. The following description is therefore to be broadly construed as including such substitute constructions and arrangements of parts which are the obvious equivalents of those to be hereinafter referred to.

In the drawings, 1, 2 and 3 denote superposed casings, the casing 1 coöperating with the other casings in providing an inclosure for a change speed gear mechanism including an engine shaft 4, a drive shaft 5, a counter shaft 6, gear wheels 7, 8 and 9 on the counter shaft 6, a train of gears 10 between the engine shaft 4 and the counter shaft 6, shiftable gear wheels 11 and 12 on the drive shaft 5, and a clutch 13 between the shiftable gear wheel 12 and the engine shaft 4 adapted for establishing rotative continuity between the engine and drive shaft. The elements 1, 4 to 13 inclusive are of the ordinary and well known type and located within the casing 2, on rods 14 are shiftable members 15 and 16 for shifting the gear wheels 12 and 11 respectively. The confronting faces of the members 15 and 16 are recessed, as at 17, to receive the lower end of a main operating lever 18, said lever being shiftable longitudinally and transversely of the casing 2. With the lower end of the lever 18 in the recess of the member 16, said member may be moved to shift the gear wheel 11 into mesh with the gear wheel 9 for reverse motion, or into mesh with the gear wheel 8 for first speed. By shifting the lower end of the lever 18 transversely of the casing 2 into the recess 17 of the shiftable member 15, this member may be moved to shift the gear wheel 12 into mesh with the gear wheel 7 for second speed, or into engagement with the clutch 13 for the third speed. The elements 14 to 17 inclusive are of a conventional type, and constitute means for shifting the gear wheels of the change speed mechanism for neutral and reverse positions and first, second and third speeds.

The main operating lever 18 is mounted upon a reciprocable shaft 19, loose in bearings 20 and 21 forming part of the side walls 3. One end of the shaft 19 constitutes the core of a solenoid 22, carried by the bearing 21, and encircling the reciprocable shaft 19, between the bearing 21 and the lever 18 is a coiled spring 23, said spring maintaining the shaft 19 in neutral position, with the lower end of the operating lever 18 normally in the recess 17 of the shiftable member 16, so that should the operating lever 18 be shifted, first speed or reverse position will be attained in connection with the change speed mechanism.

Pivotally connected to one side of the main operating lever 18 above and below the shaft 19, are selector arms 24 and 25 having hook shaped ends 26 and other ends pivotally connected by a vertically disposed link 27. The link 27 is recessed, as at 28, to receive the offset portion 29 of a solenoid arm 30, said arm extending through a slot 31 in the wall of the casing 3. The arm 30 is carried by the upper end of a core 32 forming part of a solenoid 33, said solenoid being mounted upon the base of the casing 3. Encircling the core 32 is a coiled spring 34 and the expansive force of this spring holds the core 32 normally raised with the hook shaped end 26 of the selector arm 24 normally lowered.

The casing 3 is provided with a housing 35 for the main electrical operating devices, which are in the form of solenoids 36 and 37 arranged in parallelism with a plunger 38 between the solenoids and slidable in a bearing 39 forming part of the housing 35. The plunger 38 within the housing 35 has a cross head 40 and connected to the ends of this cross head are the cores 41 and 42 of the solenoids 36 and 37 respectively. By reference to Fig. 4 of the drawings, it will be noted that the greater part of the core 41 is of non-magnetic material, as brass, and the inner end of the core is of soft iron, while the greater part of the core 42 is of soft iron and the inner end of brass or other non-magnetic material. The solenoid 36 is employed as a power solenoid for actuating one or the other of the selector arms 24 and 25, while the solenoid 37 is only employed for restoring the plunger 38 to normal position and maintaining the operating lever 18 in neutral position.

The inner end of the plunger 38 has an offset head 43 adapted for engagement with either of the hook shaped ends 26 of the selector arms 24 or 25, also for engaging the edge of the main operating lever 18 and returning said lever in a vertical neutral position.

Before further describing the electrical control of the mechanism, I desire to direct attention to the fact that the casing 3 has an H plate 44 with the slot 45 suitably designated, as shown in Fig. 5. A hand rod or lever 46 may be extended through the H slot 45 of the plate 44 and over the upper end of the main operating lever 18, whereby this lever may have the lower end thereof manually shifted longitudinally or transversely of the casing 2 to operate the change speed mechanism.

Reference will now be had to Figs. 14, 15 and 16, showing the selector mechanism and diagrammatically the electrical operating devices with the circuits between said devices and the selector mechanism. The selector mechanism comprises an oblong casing 47 having the front wall 48 thereof provided with openings 49 for the shanks 50 of push buttons or switch instrumentalities which will be hereinafter referred to as the "neutral button", "reverse button", "first speed button", "second speed button", and "third speed button." The shanks 50 extend into and are guided by a partition 51 in parallelism with the front wall 48 of the casing 47 and each shank has a head or fixed washer 52 within the casing 47 engaged by a coiled compression spring 53 encircling each shank. The expansive force of the springs 53 retains the buttons normally retracted, but permits of said buttons being pushed inwardly to establish electrical circuits.

Within the casing 47 are blocks of insulation 54 and these blocks support contacts adapted to be engaged by the inner ends of the various buttons. First, there is a contact 55 for the shank 50 of the neutral button, and this contact is connected by a wire 56 to the neutral solenoid 37, and said solenoid by wires 57 and 58 to a suitable source of electrical energy, as batteries 59. The batteries 59 are connected by a wire 60 to a contact 61 in the path of the clutch pedal or lever 62, this clutch pedal or lever controlling the operation of the drive shaft of an automobile relative to the engine shaft. The clutch has been diagrammatically illustrated and designated 63 and with the clutch "open", the clutch pedal or lever 62 engages the contact 61 and through wires 64, 65 and the neutral button establishes an electrical circuit through the solenoid 37. When the neutral solenoid 37 is energized by pushing inwardly upon the neutral button, the offset head 43 of the plunger 38 engages the main operating lever 18 and moves and holds the same to a vertical neutral position, as shown in Fig. 1.

Second, there are contacts 66 and 67 for the shank 50 of the reverse button. The contact 66 is connected by a wire 68 with the power solenoid 36 and this solenoid is connected by a wire 69 to the wire 58 leading to the battery 59. The contact 67 is connected by a wire 70 to the solenoid 33 employed for shifting the selector arms 24 and 25 and said solenoid is connected by a wire 71 to the wire 58. The reverse button is connected to the wire 64 and it is apparent that when said button is pushed inwardly, a circuit is first established to energize the solenoid 33 to shift the selector arms 24 and 25, and then a circuit established to energize the power solenoid 36, which causes the head 43 to engage the selector arm 25, shift the main operating lever 18 and the member 16.

When the solenoid 33 is energized, the selector arm 24 is tilted out of the path of the head 43, consequently the power solenoid 36 can only actuate the lever 18 through the medium of the selector arm 25. It is by virtue of the progressive circuits that the solenoid 33 is energized in advance of the solenoid 36.

Third, the first speed button is connected to the wire 64 and said button has a contact 72 connected by a wire 73 to the wire 68, whereby the power solenoid 36 will be energized when the circuit is completed.

Fourth, the second speed button is connected to the wire 64, and this button is adapted to successively engage contacts 74, 75 and 76. The contact 74 is connected by a wire 77 to the solenoid 22 employed for reciprocating the shaft 19, and said solenoid is connected by a wire 78 to the wire 58 so that a circuit will be established when the second speed button engages the contact 74. By energizing the solenoid 22, the shaft 19 is reciprocated to place the lower end of the main operating lever 18 in the recess 17 of the shiftable member 15.

The contact 75 is connected by a wire 79 to the wire 70 so that the next circuit established will energize the solenoid 33 and place the selector arm 25 in position to be shifted by the power solenoid 36, which is next energized by the second speed button engaging the contact 76. This contact is connected by a wire 80 to the wire 68.

Now, there are two contacts 81 and 82 for the third speed button, the contact 81 being connected with a wire 77 so that the solenoid 22 will be first energized to reciprocate the shaft 19. The contact 82 is connected by a wire to the wire 68 so that the power solenoid 36 will be energized after the solenoid 22.

From the foregoing it will be observed that the various contacts are disposed so that the solenoids 22 and 33 will always be energized in advance of the power solenoid 36 and this is necessary in order that the lower end of the main operating lever 18 may be placed in engagement with the proper shiftable member 15 or 16 and the proper selector arm 24 or 25 placed in position to be moved when the power solenoid 36 is energized.

It will be noted that all of the circuits of the push buttons are through the clutch pedal or lever 62 and that none of the circuits can be completed by any of the push buttons unless the clutch pedal or lever 62 engages the contact 61, in which position the clutch is "open" and consequently the automobile coasting or idle.

In connection with the push buttons, provision has been made for locking either the reverse, first, second, or third speed buttons, when actuated, until such time that the neutral button is actuated, thereby making it necessary to restore the change speed mechanism to neutral position before either of the other buttons can be actuated to shift the gears of the change speed mechanism.

The locking device comprises a spring pressed plate 83 slidable against the inner side of the front wall 48 and said plate is provided with openings 84 to provide clearance for the shanks 50 of the push buttons. Each of the openings 84 has beveled end walls 85 and each of the shanks 50 have beveled portions 86, 87 and 88. The beveled portions 86 normally engage the slidable locking plate 83 and when a push button is actuated, the beveled portion 86 moving inwardly shifts the locking plate 83 and said plate is again shifted by the beveled portion 88. The slidable locking plate 83 eventually engages behind the beveled portion 88 of the push button and locks the push button in a circuit-making position, with the spring 53 of the push button under compression. With one of the push buttons locked in this manner, the slidable locking plate 83 extends in front of the beveled portions 87 of the remaining push buttons, with the exception of the neutral button, thus preventing the reverse and remaining speed buttons from being actuated until the other speed button is released. This can only be accomplished by actuating the neutral button, which has a beveled portion 88 which will shift the slidable locking plate and release the previously actuated push button. Of course, in actuating the neutral button and releasing the previously actuated button, the circuit of the previously actuated button is first broken and then the circuit of the neutral button established, whereby the mechanism will be restored to neutral position before another button may be pushed.

The slidable locking plate 83 is normally pressed by a spring 89 carried by the partition 51, consequently the locking of an actuated push button is automatic and before the actuated push button can be released, there must be a manual actuation of the neutral push button and the function of this button can only be accomplished when the clutch 63 is open.

It is believed that by reviewing the operation of the second speed button that the automatic gear shifting mechanism will be readily understood. As shown in Fig. 1, the selector arm 24 is in an active position, and as shown in Fig. 15, the third speed button has been actuated and is locked, therefore, before the second speed button can be actuated, it is necessary that the clutch pedal or lever 62 be released to partially complete the neutral circuit and then the neutral button actuated to restore the mechanism to neutral position and unlock the remaining buttons.

Now, with the mechanism in neutral position, and it is desired to obtain second speed, the second speed button is pushed inwardly and first engages the contact 74 thereby establishing an electric circuit which will energize the solenoid 22 and cause the shaft 19 to be retracted. As this shaft is retracted the spring 23 is placed under tension and the main operating lever 18 shifted into the recess 17 of the member 15. A further movement of the second speed button causes the shank 50 thereof to engage the contact 75 establishing a circuit which energizes the solenoid 33. As the core 32 of this solenoid is retracted and the spring 34 placed under tension, the arm 30 is lowered and as said arm extends into the link 27, the selector arms 24 and 25 are rocked upon the pivots thereof. The selector arm 24 is shifted out of the path of the head 43 and the hook shaped end 26 of the selector arm 25 placed in the path of the head 43. Next, the shank 50 of the second speed button will engage the contact 76 and establish a circuit which will energize the power solenoid 36. When this solenoid is energized, the plunger 38 is shifted to move the head 43 against the hook shaped end 26 of the selector arm 25, thereby shifting the lower end of the main operating lever 18 so that the member 15 will shift the gear wheel 12 into engagement with the gear wheel 7, thereby establishing a power transmission between the engine shaft 4 and the drive shaft 5 so as to provide second speed. Of course, the second speed button will be locked by the slidable locking plate 83 and before any change can be made in the speed mechanism, it is necessary to release the clutch pedal or lever 62 and then actuate the neutral button. This neutral button not only releases the second speed button but unlocks the remaining buttons and establishes a circuit which will energize the neutral solenoid 37, this solenoid causing the head 43 to engage the main operating lever 18 and restore it to a vertical and neutral position such as shown in Fig. 1.

When the solenoids 22 and 33 are de-energized the springs 23 and 34 restore the cores of said solenoids to normal position. When the core shaft 19 is restored to normal position, the main operating lever 18 is placed in position for reverse or first speed.

What I claim is:—

1. In an automatic gear shifting mechanism, a lever adapted for changing the gears of a change speed mechanism, an electric device adapted for laterally adjusting said lever, selector arms on said lever, an electric device adapted for shifting said arms, and an electric device adapted for engaging either arm and oscillating said lever.

2. In an automatic gear shifting mechanism, a lever adapted for changing the gears of a change speed mechanism, an electric device adapted for laterally adjusting said lever, selector arms on said lever, an electric device adapted for shifting said arms, an electric device adapted for engaging either arm and oscillating said lever, and an electric device adapted for restoring said lever to neutral position.

3. In an automatic gear shifting mechanism, a lever adapted for changing the gears of a change speed mechanism, an electric device adapted for laterally adjusting said lever, selector arms on said lever, an electric device adapted for shifting said arms, an electric device adapted for engaging either arm and oscillating said lever, an electric device for restoring said lever to neutral position, and selector mechanism for said electrical devices necessitating the actuation of the last mentioned device after actuation of either of the other electrical devices.

4. In an automatic gear shifting mechanism, a lever adapted for changing the gears of a change speed mechanism, a laterally disposed solenoid adapted for laterally shifting said lever for second and third speeds, electrically set selector arms carried by said lever, and electrically operated means adapted for engagement with either of said arms to oscillate said lever.

5. In an automatic gear shifting mechanism, a lever adapted for changing the gears of a change speed mechanism, means adapted for laterally shifting said lever for second and third speeds, pivoted selector arms on said lever, a connection between the ends of said arms and electrically actuated for setting either of said arms in an active position so that said lever may be oscillated, and an electrical device adapted for engagement with either of said selector arms when set, for oscillating said lever.

6. In an automatic gear shifting mechanism, a lever adapted for changing the gears of a change speed mechanism, a solenoid core supporting said lever and adapted for laterally shifting said lever for second and third speeds, electrically set pivoted selector arms on said lever, an electrical device adapted for engagement with either of said arms when set for oscillating said lever, and means forming part of the last mentioned electrical device adapted for restoring said lever to neutral position.

7. In an automatic gear shifting mechanism, a lever adapted for changing the gears of a change speed mechanism, a solenoid core supporting said lever and adapted for laterally shifting said lever for second and third positions, means in connection with the solenoid core for maintaining said lever in position for oscillation for either reverse or first speed positions, electrically set selector arms carried by said lever, and electrically actuated means adapted for engagement with either of said selector arms to oscillate said lever for a desired position.

8. In an automatic gear shifting mechanism, gear shifting members, a lever normally engaging one of said members and capable of lateral adjustment relative to the other member, an electrical device for laterally adjusting said lever, electrically set selector arms on said lever, and electrical means adapted for engagement with either arm to shift the arm and oscillate the lever.

9. In an automatic gear shifting mechanism, a lever adapted for changing the gears of a change speed mechanism, electrical devices for shifting said lever, and a selector mechanism for said electrical devices including an electrical neutral device and a reverse and speed devices, and means adapted for locking either of said reverse and speed devices and releasable by an actuation of said neutral device.

10. In an automatic gear shifting mechanism, a lever adapted for changing the gears of a change speed mechanism, electrical devices adapted for shifting the lever, so that neutral, reverse, first, second and third speed positions may be obtained, selector mechanism for said devices, comprising—in combination with a suitable source of electrical energy,—a neutral circuit closing instrumentality adapted in conjunction with a clutch pedal to complete the circuit in connection with one of said devices to restore said lever to neutral position, and other circuit closing instrumentalities adapted for circuits including the clutch pedal and adapted when actuated to establish single and progressive circuits whereby the other of said electrical devices may be individually and successively energized to switch said lever to a desired position.

11. In an automatic gear shifting mechanism having a lever for changing gears and electrical devices for shifting said lever, a selector mechanism for said electrical devices comprising,—in combination with a suitable source of electrical energy,—a neutral circuit closing instrumentality adapted in conjunction with a clutch pedal to complete a circuit in connection with one of said devices to restore said lever to neutral position, other circuit closing instrumentalities adapted for circuits including the clutch pedal and adapted when actuated to establish single and progressive circuits so that the other said electrical device may be individually and successively energized to shift said lever to a desired position, and means adapted for locking the last mentioned instrumentalities and releasable only by an actuation of the neutral circuit closing instrumentality.

12. In an automatic gear shifting mechanism having a lever for changing gears, and electrical devices and a suitable source of electrical energy for shifting said lever, a plurality of switch buttons in normally open individual and progressive circuits with said electrical devices and the source of electrical energy, one of said push buttons when actuated causing one of said electrical devices to restore said lever to neutral position, and means adapted for locking either of the other push buttons when actuated until the neutral push button is actuated.

13. In a selector mechanism for an electrically operated gear shifting mechanism associated with a change speed gear mechanism, the combination with a suitable source of electrical energy, and a clutch pedal in circuit therewith, of neutral, reverse, first, second and third speed push buttons adapted for completing optional circuits for the electrical gear shifting mechanism to operate said mechanism, the circuits of said push buttons being controlled by said clutch pedal, and means adapted for automatically locking either of the reverse, first, second and third speed buttons and releasable by an actuation of the neutral push button.

14. In a selector mechanism for an electric operated gear shifting mechanism associated with a change speed gear mechanism, the combination with a suitable source of electrical energy, of neutral, reverse, first, second and third speed push buttons in normal open circuit with said source of electrical energy adapted for completing circuits for the electrical gear shifting mechanism to operate said mechanism, and means automatically actuated by either of the reverse, first, second and third speed push buttons to lock an actuated button in a closed circuit and to lock the other buttons except the neutral button, against actuation, said means being releasable by said neutral button.

In testimony whereof I affix my signature in the presence of two witnesses.

ALBERT J. SCHOENBEIN.

Witnesses:
 JOHN WESSELY,
 JULIAN F. FRANKE.